US012684375B2

(12) United States Patent
Kato et al.

(10) Patent No.: US 12,684,375 B2
(45) Date of Patent: Jul. 14, 2026

(54) MOBILE TERMINAL TEST SYSTEM AND MOBILE TERMINAL TEST METHOD

(71) Applicant: ANRITSU CORPORATION, Kanagawa (JP)

(72) Inventors: Seiya Kato, Kanagawa (JP); Ryota Chinbe, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 380 days.

(21) Appl. No.: 18/186,603

(22) Filed: Mar. 20, 2023

(65) Prior Publication Data

US 2023/0328555 A1 Oct. 12, 2023

(30) Foreign Application Priority Data

Mar. 28, 2022 (JP) ................................. 2022-051764

(51) Int. Cl.
*H04W 24/06* (2009.01)

(52) U.S. Cl.
CPC .................................. *H04W 24/06* (2013.01)

(58) Field of Classification Search
CPC ........................ H04W 24/00–10; H04W 24/06
See application file for complete search history.

(56) References Cited

U.S. PATENT DOCUMENTS

| | | | | |
|---|---|---|---|---|
| 2003/0231741 A1* | 12/2003 | Rancu | ................... | H04M 3/303 |
| | | | | 379/1.01 |
| 2010/0265822 A1* | 10/2010 | Rodriguez-Sanchez | ..................... | |
| | | | | H04W 40/00 |
| | | | | 370/232 |
| 2013/0142236 A1* | 6/2013 | Lee | ..................... | H04L 25/0232 |
| | | | | 375/224 |
| 2017/0324617 A1* | 11/2017 | Prasad | ................... | H04W 24/02 |

FOREIGN PATENT DOCUMENTS

| | | | | |
|---|---|---|---|---|
| JP | 5112463 B2 | 1/2013 | | |
| JP | 2019029741 A | * | 2/2019 | ............. H04L 5/001 |

OTHER PUBLICATIONS

Friden, 5G Over-the-Air Conformance Testing, 2020, 14th European Conference on Antennas and Propagation (Year: 2020).*
Tanner, 3GPP Functional and Performance Testing of User Equipment, 2002, Third International Conference on 3G Mobile Communication Technologies (Year: 2002).*

* cited by examiner

*Primary Examiner* — Raymond S Dean
(74) *Attorney, Agent, or Firm* — McDonald Hopkins LLC

(57) ABSTRACT

There is provided a mobile terminal test system and a mobile terminal test method capable of greatly reducing a time required to a setting of a parameter for a plurality of test cases. A common parameter extraction unit that extracts parameters of the same type among a plurality of parameters included in a plurality of test cases selected by an operation unit as a plurality of common parameters, a display control (Continued)

unit that displays a list of plurality of common parameters extracted by the common parameter extraction unit on a display unit, a common parameter setting unit that collectively sets respective change values input by the operation unit to the plurality of common parameters, and a test execution unit that executes a test of the plurality of test cases by using the plurality of common parameters set by the common parameter setting unit are included.

6 Claims, 5 Drawing Sheets

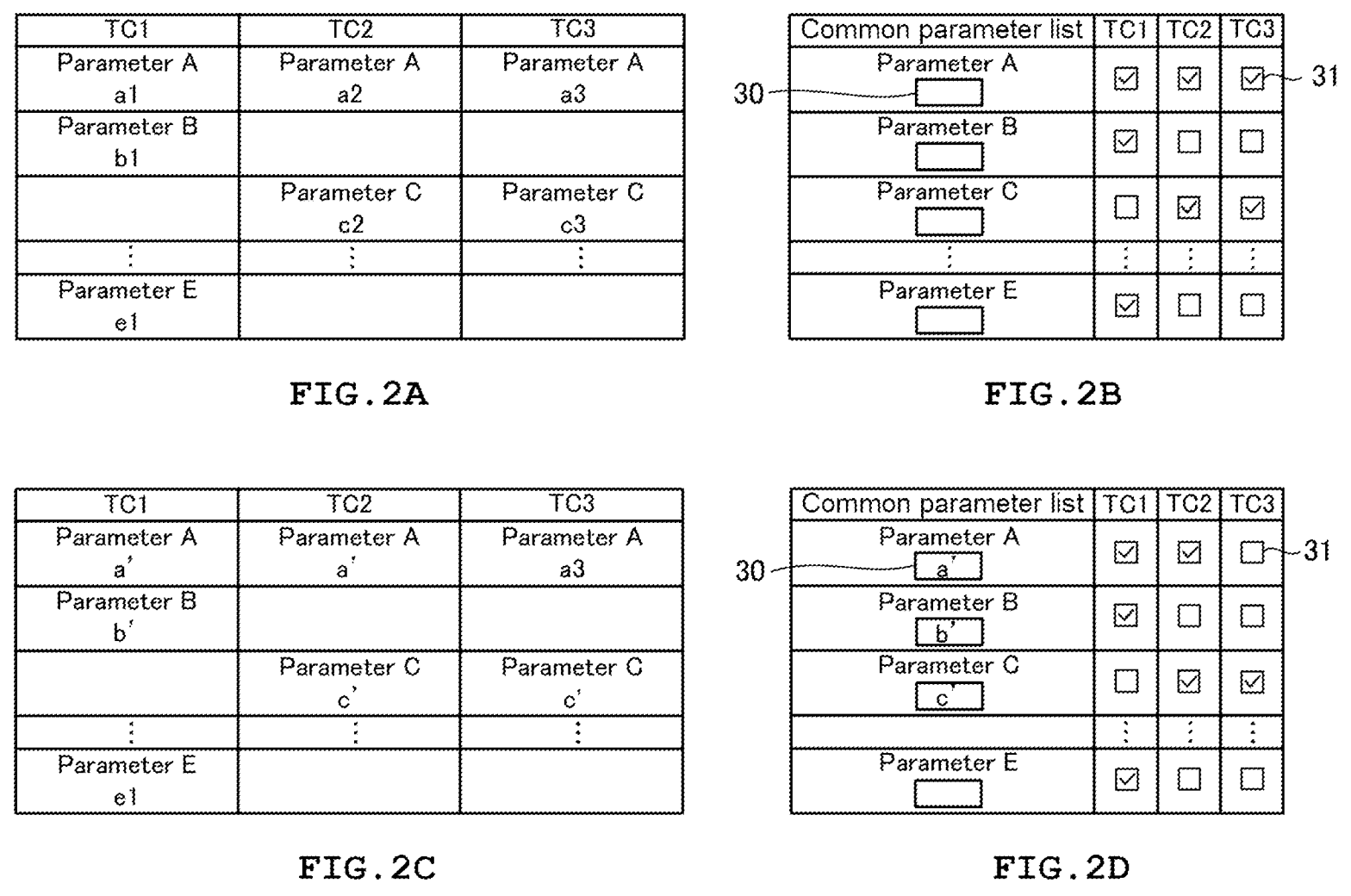

| TC1 | TC2 | TC3 |
|---|---|---|
| Parameter A a1 | Parameter A a2 | Parameter A a3 |
| Parameter B b1 | Parameter C c2 | Parameter C c3 |
| ... | ... | ... |
| Parameter E e1 | | |

FIG. 2A

| Common parameter list | TC1 | TC2 | TC3 |
|---|---|---|---|
| Parameter A [ ] | ☑ | ☑ | ☑ 31 |
| Parameter B [ ] | ☑ | ☐ | ☐ |
| Parameter C [ ] | ☐ | ☑ | ☑ |
| ... | ... | ... | ... |
| Parameter E | ☑ | ☐ | ☐ |

| TC1 | TC2 | TC3 |
|---|---|---|
| Parameter A a' | Parameter A a' | Parameter A a3 |
| Parameter B b' | Parameter C c' | Parameter C c' |
| ... | ... | ... |
| Parameter E e' | | |

FIG. 2C

| Common parameter list | TC1 | TC2 | TC3 |
|---|---|---|---|
| Parameter A a' | ☑ | ☑ | ☐ 31 |
| Parameter B b' | ☑ | ☐ | ☐ |
| Parameter C c' | ☐ | ☑ | ☑ |
| ... | ... | ... | ... |
| Parameter E | ☑ | ☐ | ☐ |

MOBILE TERMINAL TEST SYSTEM AND MOBILE TERMINAL TEST METHOD

TECHNICAL FIELD

The present invention relates to a mobile terminal test system and a mobile terminal test method, and more particularly, to a mobile terminal test system and a mobile terminal test method of having a pseudo base station function capable of communication connection with a mobile terminal and executing a conformance test of the mobile terminal in conformity with the 3GPP standard.

BACKGROUND ART

In recent years, 5G services that operate millimeter waveband frequencies have started in each country, and the production of 5G mobile terminals such as 5G smartphones is in full swing. A design and development company or a manufacturing factory of the 5G mobile terminal performs a performance test of measuring an output level or a reception sensitivity of transmission radio waves via a wireless communication antenna provided in the 5G mobile terminal, and determining whether or not the 5G mobile terminal satisfies a predetermined criterion.

Among such performance tests, there is a conformance test for checking whether or not a mobile terminal or a base station apparatus conforms with the 3rd Generation Partnership Project (3GPP) standard. In the conformance test, a Test Case (TC), in which a test purpose, a conformance and nonconformance determination criterion, a test condition, a test item identified by a Test ID, and a test procedure are defined, is executed.

Patent Document 1 describes a process procedure for shortening a test time by omitting execution of duplicated process items among a plurality of test cases which are executed consecutively.

RELATED ART DOCUMENT

Patent Document

[Patent Document 1] Japanese Patent No. 5112463

DISCLOSURE OF THE INVENTION

Problem that the Invention is to Solve

Each test case in the conformance test of the mobile terminal has many parameters, which are respectively required for measurement. For example, there are parameters such as Band Combination, Temperature Voltage Combination, Channel Bandwidth, and Subcarrier Spacing (SCS) defined by 3GPP. Among these parameters, Band Combination is a parameter that a indicates combination of frequency bandwidths used by the mobile terminal for communication. Channel Bandwidth is a parameter indicating a bandwidth of frequencies used by the mobile terminal for communication. SCS is a parameter that indicates a frequency width between subcarriers in OFDM transmission used by the mobile terminal.

In general, when a test system that supports a conformance test as disclosed in Patent Document 1 tests a performance of a mobile terminal to be measured, it is necessary to perform a test by using dozens of test cases. A user must individually set the parameters described above for each test case on system software. Therefore, there is a problem that it takes a lot of effort and time for the user to create a test list (hereinafter, also referred to as a "sequence") of the mobile terminal. In addition, when the user individually sets the parameters for each test case, there is another problem that parameter setting omissions occur.

The present invention is made to solve such problems in the related art, and to provide a mobile terminal test system and a mobile terminal test method capable of greatly reducing a time required to a setting of a parameter for a plurality of test cases and preventing mistakes such as setting omissions of the parameter.

Means for Solving the Problem

In order to solve the problem described above, according to the present invention, there is provided a mobile terminal test system that executes a test of a test case in a conformance test defined by a 3GPP standard of a mobile terminal, the mobile terminal test system including: a test case selection unit that selects a plurality of test cases; a common parameter extraction unit that extracts parameters having the same type, among a plurality of parameters included in the plurality of test cases selected by the test case selection unit, as a plurality of common parameters; a common parameter display control unit that displays a list of the plurality of common parameters extracted by the common parameter extraction unit on a display unit; a common parameter change input unit that inputs a change value of a set value of each of the plurality of common parameters; a common parameter setting unit that collectively sets the respective change values input by the common parameter change input unit to the plurality of common parameters; and a test execution unit that executes a test of the plurality of selected test cases, by using the plurality of common parameters set by the common parameter setting unit.

With this configuration, the mobile terminal test system according to the present invention has a configuration in which common parameters included in a plurality of test cases added to a sequence are extracted and respective change values input by a user are collectively set to the plurality of common parameters. With this configuration, the mobile terminal test system according to the present invention does not need for the user to individually set various parameters for each test case, so that it is possible to greatly reduce a time required for setting the parameters for the plurality of test cases. Further, since the mobile terminal test system according to the present invention can prevent omissions and mistakes in a setting of the parameters by the user, it is possible to complete measurement of a large number of test cases in a short period of time and with a minimum number of operations.

In addition, the mobile terminal test system according to the present invention, may further include: a test case designation unit that designates, among the plurality of selected test cases, a test case for setting the change value to the common parameter by the common parameter setting unit.

With this configuration, the mobile terminal test system according to the present invention is configured such that a test case for collectively setting a change value to a common parameter can be arbitrarily designated, among the plurality of selected test cases. With this configuration, the mobile terminal test system according to the present invention can set a value different from the value of other test cases, in some of the plurality of selected test cases, to the common parameter.

In addition, according to the present invention, there is provided a mobile terminal test method of executing a test of a test case in a conformance test defined by a 3GPP standard of a mobile terminal, the method including: a test case selection step of selecting a plurality of test cases; a common parameter extraction step of extracting parameters having the same type, among a plurality of parameters included in the plurality of test cases selected in the test case selection step, as a plurality of common parameters; a common parameter display step of displaying a list of the plurality of common parameters extracted in the common parameter extraction step on a display unit; a common parameter change input step of inputting a change value of a set value of each of the plurality of common parameters; a common parameter setting step of collectively setting the respective change values input in the common parameter change input step to the plurality of common parameters; and a test execution step of executing a test of the plurality of selected test cases, by using the plurality of common parameters set in the common parameter setting step. Further, in the mobile terminal test method according to the present invention, the common parameter setting step may further include a step of designating, among the plurality of selected test cases, a test case for setting the change value to the common parameter.

Advantage of the Invention

The present invention provides a mobile terminal test system and a mobile terminal test method capable of greatly reducing a time required to a setting of a parameter for a plurality of test cases and preventing mistakes such as setting omissions of the parameter.

BRIEF DESCRIPTION OF THE DRAWINGS

[FIGS. 2A to 2D] FIG. 2A is a diagram illustrating an example of a list of test cases and parameters added to a sequence, FIG. 2B is a diagram illustrating an example of a list of common parameters, FIG. 2C is a diagram illustrating an example of a list of test cases and parameters in a state in which a change value is set to a common parameter, and FIG. 2D is a diagram illustrating an example of a list of common parameters in a state in which the change value of the common parameter is input.

BEST MODE FOR CARRYING OUT THE INVENTION

Hereinafter, embodiments of a mobile terminal test system and a mobile terminal test method according to the present invention will be described with reference to the drawings.

Figure 1:
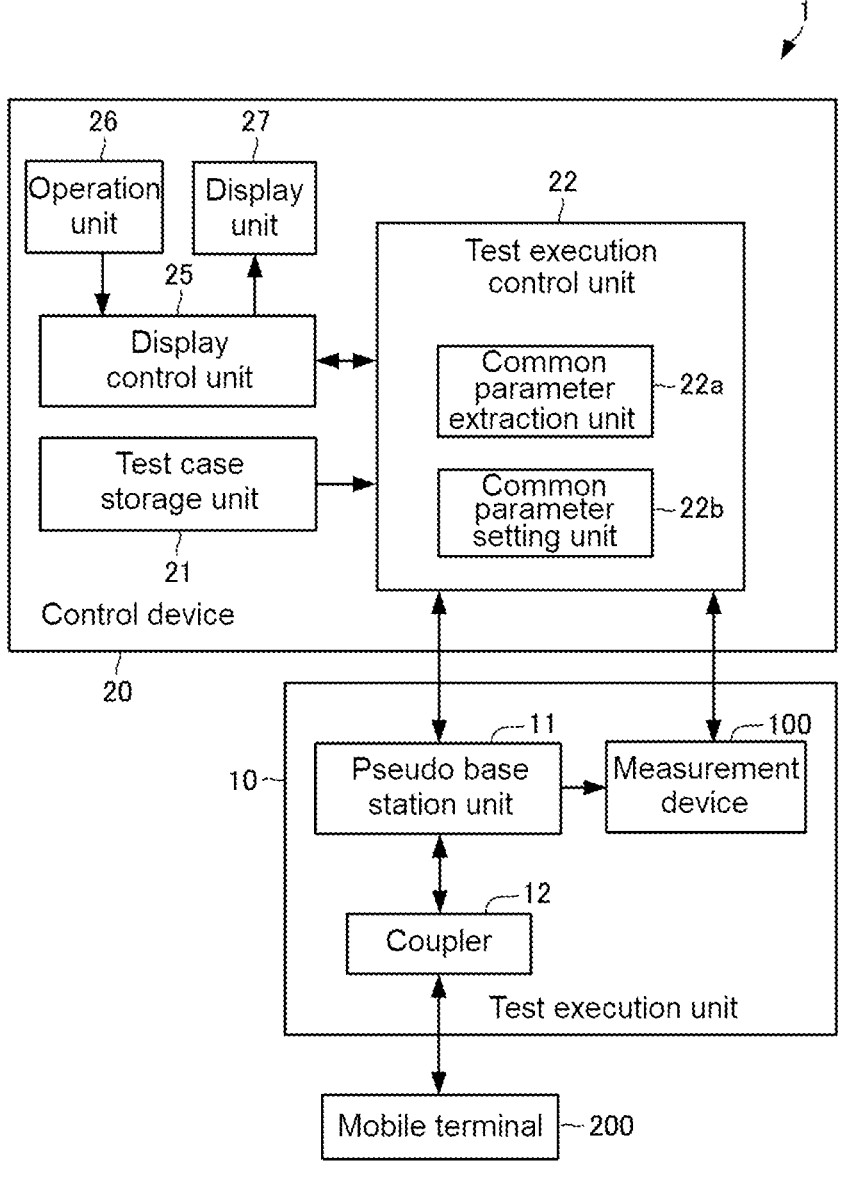
FIG. 1 is a block diagram illustrating a configuration of a mobile terminal test system according to an embodiment of the present invention.

As illustrated in FIG. 1, a mobile terminal test system 1 according to the present embodiment mainly operates as a pseudo base station, and executes a test of test cases in a conformance test of a mobile terminal 200 defined by the 3GPP standard on the mobile terminal 200, and includes a test execution unit 10 and a control device 20.

The test execution unit 10 has a pseudo base station unit 11, a coupler 12, and a measurement device 100. Under control of the control device 20, the pseudo base station unit 11 establishes a wireless communication connection or wired communication connection with the mobile terminal 200, and exchanges call connection and signaling messages. In addition, the pseudo base station unit 11 outputs a state and the like of communication with the mobile terminal 200 to the control device 20. The pseudo base station unit 11 and the mobile terminal 200 are coupled via the coupler 12 functioning as an RF port and an RF cable (not illustrated).

The measurement device 100 measures transmission and reception characteristics of the mobile terminal 200. The measurement device 100 can measure, for example, transmission power, Error Vector Magnitude (EVM), IQ constellation, spectrum, and the like, as the transmission characteristics of the mobile terminal 200. Further, the measurement device 100 can measure, for example, a Packet Error Rate (PER), a Frame Reception Rate (FRR), and the like, as the reception characteristics of the mobile terminal 200.

The control device 20 includes a test case storage unit 21, a test execution control unit 22, a display control unit 25, an operation unit 26, and a display unit 27.

The test case storage unit 21 stores a list of test cases for a conformance test in conformity with the 3GPP standard and a plurality of parameters for each test case such as a test condition or a test item.

The test condition is a condition set in the measurement device 100 in order to test a frequency, an intensity, and a phase of an RF signal transmitted and received by the mobile terminal 200. For example, parameters of the test condition are a test environment (Test Environment and Temperature Voltage Combination), a frequency (Band Combination, Test Frequency, Operating Band, Downlink Frequency, Uplink Frequency, Downlink Point A, and Uplink Point A), a test bandwidth BW (Test Channel Bandwidth and Test EN-DC bandwidth combination), Subcarrier Spacing (SCS), Synchronization Signal/PBCH Block (SSB), and the like.

The test item is identified by a Test ID and defined by test parameters such as a modulation scheme (OFDM) and resource block allocation (RB Allocation and RB Allocation Pattern). Each test item is executed for each combination of the parameters of the test condition described above.

The display control unit 25 displays an image on the display unit 27, and performs control of generating and displaying the image according to an instruction from the test execution control unit 22. In addition, the display control unit 25 changes the display of the display unit 27 based on information input to the operation unit 26, and transmits the information input to the operation unit 26 to the test execution control unit 22.

The display control unit 25 displays a list of plurality of test cases and parameters added to a sequence by the operation unit 26 on the display unit 27. Here, the sequence is a test list including information on an order in which the plurality of test cases are executed and information on the parameter used in each test case. The display control unit 25 also constitutes a common parameter display control unit that displays a list of plurality of common parameters extracted by a common parameter extraction unit 22a, which will be described below, on the display unit 27.

The operation unit 26 is for accepting an operation input by a user, and is configured with, for example, a touch panel including a touch sensor for detecting a contact position by a contact operation with an input surface corresponding to a display screen of the display unit 27. Alternatively, the operation unit 26 may include an input device such as a keyboard or a mouse. The operation input to the operation unit 26 is detected by the display control unit 25.

The operation unit 26 constitutes a test case selection unit for the user to select the plurality of test cases to be added to the sequence. The operation unit 26 also constitutes a common parameter change input unit for inputting a change value of a set value of each of the plurality of common parameters displayed on the display unit 27. Here, the common parameter refers to a parameter of the same type, among a plurality of parameters included in a plurality of test cases. The operation unit 26 constitutes a test case designation unit that designates, among the plurality of test cases, a test case for setting the change value to the common parameter by a common parameter setting unit 22*b*, which will be described below.

The display unit 27 is configured with a display device such as a liquid crystal display or a CRT, and displays various display contents such as a setting screen or a test result related to test measurement of the test case for the mobile terminal 200 by the measurement device 100 on the display screen, based on display control by the display control unit 25. Further, the display unit 27 displays an operation target such as a button, a soft key, a pull-down menu, and a text box for setting various conditions.

The test execution control unit 22 reads a plurality of test cases added to the sequence by an operation input of the user to the operation unit 26 from the test case storage unit 21. In addition, the test execution control unit 22 performs control of causing the measurement device 100 to execute measurement of a test of the plurality of test cases read from the test case storage unit 21, by using various parameters including the plurality of common parameters set by the common parameter setting unit 22*b*, which will be described below.

The test execution control unit 22 also includes the common parameter extraction unit 22*a* and the common parameter setting unit 22*b*.

The common parameter extraction unit 22*a* extracts parameters having the same type, among a plurality of parameters included in the plurality of test cases selected by the operation unit 26, as a plurality of common parameters. The test execution control unit 22 processes the parameters having the same type in a unit called class. For example, the common parameter extraction unit 22*a* extracts the common parameters, by performing a software process for automatically extracting a type common point from information of the class.

The common parameter setting unit 22*b* collectively sets respective change values input by the operation unit 26 to the plurality of common parameters. For example, the common parameter setting unit 22*b* sets the common parameter by performing a software process for reflecting a change by the user to the common point of the type information of the class extracted by the common parameter extraction unit 22*a* in an extraction source.

The test execution control unit 22 is configured with, for example, a microcomputer or a personal computer including a CPU, a ROM, a RAM, an HDD, and the like, and controls an operation of each unit described above constituting the mobile terminal test system 1. Further, the test execution control unit 22 transfers a predetermined program stored in the ROM or the like to the RAM and executes the program by the CPU, so that at least a part of the common parameter extraction unit 22*a* and the common parameter setting unit 22*b* can be configured by software. At least a part of the common parameter extraction unit 22*a* and the common parameter setting unit 22*b* can be configured by a digital circuit such as a Field Programmable Gate Array (FPGA), an Application Specific Integrated (ASIC), the Circuit or like. Alternatively, at least a part of the common parameter extraction unit 22*a* and the common parameter setting unit 22*b* can be configured by appropriately combining a hardware process by the digital circuit and a software process by the predetermined program.

Hereinafter, the process in the test execution control unit 22 will be described with reference to FIGS. 2A to 2D.

FIG. 2A is a diagram simply illustrating a display example on the display unit 27 of a list of plurality of test cases and parameters added to a sequence by an operation input to the operation unit 26 by a user. Here, three types of test cases, TC1, TC2, and TC3, are added to the sequence, and the number of test cases actually added to the sequence is not limited to the above description. In addition, the parameters included in any of TC1, TC2, and TC3 are four types, Parameter A, Parameter B, Parameter C, and Parameter E, and the actual number of parameters included in each test case is not limited to the above description.

In the example in FIG. 2A, TC1 includes Parameter A, Parameter B, and Parameter E, of which initial values are a1, b1, and e1. TC2 includes Parameter A and Parameter C, of which initial values are a2 and c2. TC3 includes Parameter A and Parameter C, of which initial values are a3 and c3. The common parameter extraction unit 22*a* extracts Parameter A, Parameter B, Parameter C, and Parameter E, as common parameters.

FIG. 2B is a diagram simply illustrating a display example of the display unit 27 of a list of common parameters extracted by the common parameter extraction unit 22*a*. A list of Parameter A, Parameter B, Parameter C, and Parameter E, which are the common parameters, is displayed in a field of a common parameter list. In each common parameter field of the common parameter list, a text box 30 is provided as a common parameter change input unit through which the user can input a change value to be commonly set for each common parameter via the operation unit 26.

In addition, as illustrated in FIG. 2B, check boxes 31 may be provided in fields of TC1, TC2, and TC3 for each common parameter, as test case designation units. The user can switch between input (ON) and no input (OFF) of a check mark in the check box 31 via the operation unit 26. For example, a state in which the check boxes 31 of TC1, TC2, and TC3 are turned on for Parameter A indicates that TC1, TC2, and TC3 are designated as test cases in which identical change values can be set for Parameter A. In a default display state, the check boxes 31 for all common parameters existing in each test case may be turned on.

FIG. 2D illustrates a state in which a change value a' is input for Parameter A, a change value b' is input for Parameter B, a change value c' is input for Parameter C, and no change value is input for Parameter E, in the field of the common parameter list. In addition, FIG. 2D illustrates a state in which in the fields of TC1, TC2, and TC3, the check boxes 31 of TC1 and TC2 are turned on for Parameter A, the check box 31 of TC1 is turned on for Parameter B, the check boxes 31 of TC2 and TC3 are turned on for Parameter C, and the check box 31 of TC1 is turned on for Parameter E.

FIG. 2C illustrates a list of test cases and parameters in a state in which the contents input to the list of common parameters illustrated in FIG. 2D are reflected. The change value a' is set to Parameter A in TC1 and TC2, and the initial value a3 is set to Parameter A in TC3. The change value b' is set to Parameter B in TC1. The change value c' is set to Parameter C in TC2 and TC3. The initial value e1 is set to Parameter E in TC1, as it is.

In the list of test cases and parameters illustrated in FIG. 2C, it is also possible for the user to individually change the values of the displayed parameters (a', a3, b', c', and e1) by inputting an operation to the operation unit 26.

Figure 3:
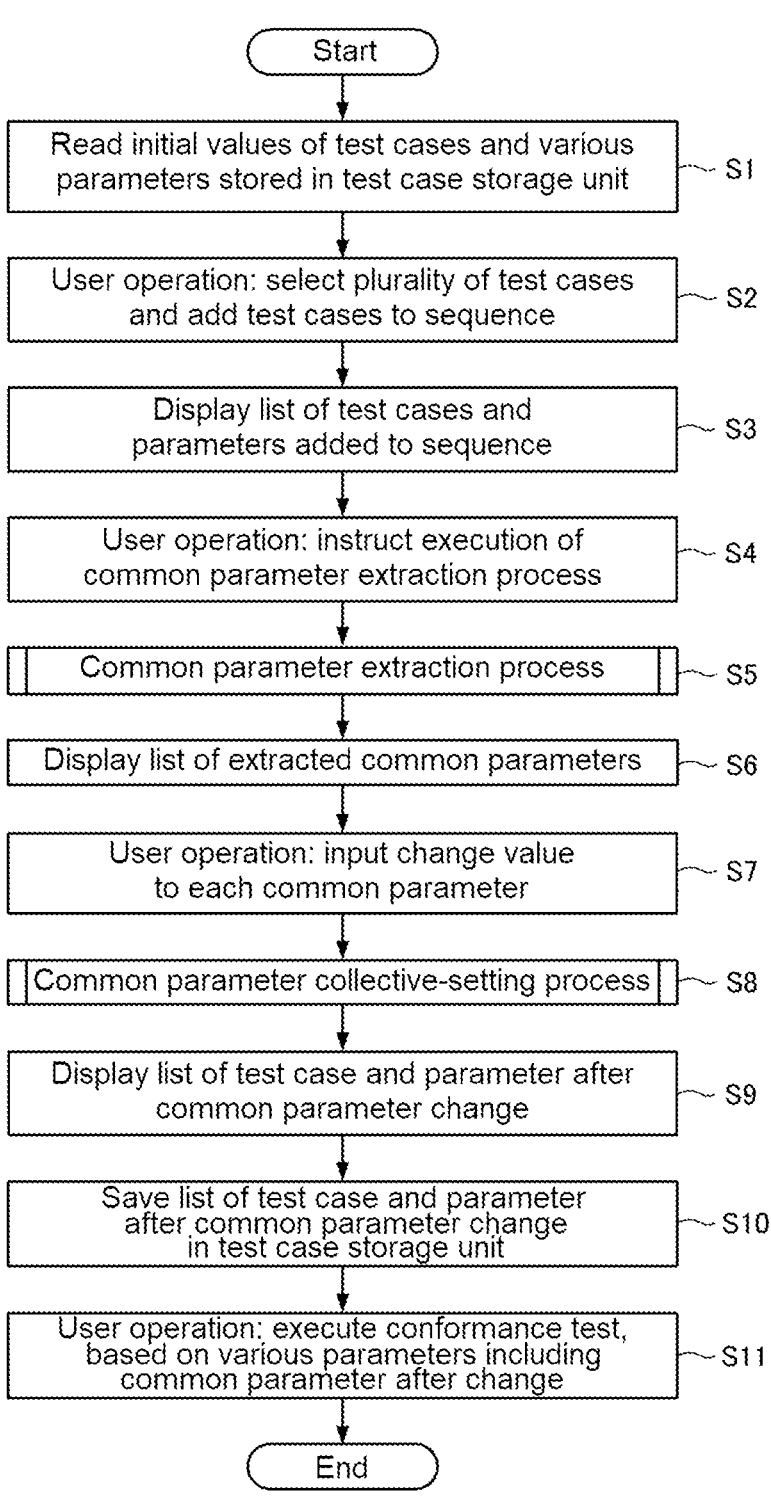
FIG. 3 is a flowchart illustrating a process of a mobile terminal test method using the mobile terminal test system according to the embodiment of the present invention.
Figure 4:
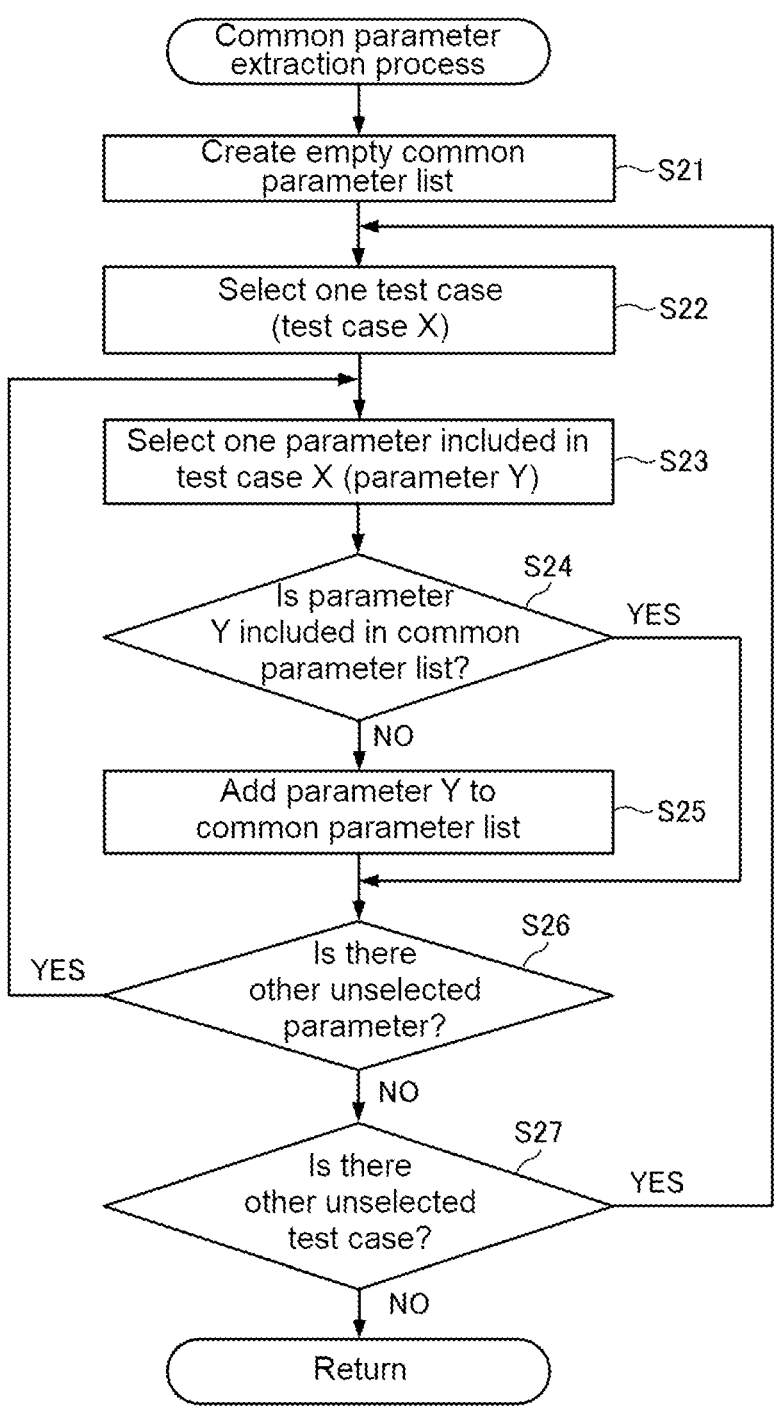
FIG. 4 is a flowchart illustrating a process in a common parameter extraction step in the flowchart in FIG. 3.
Figure 5:
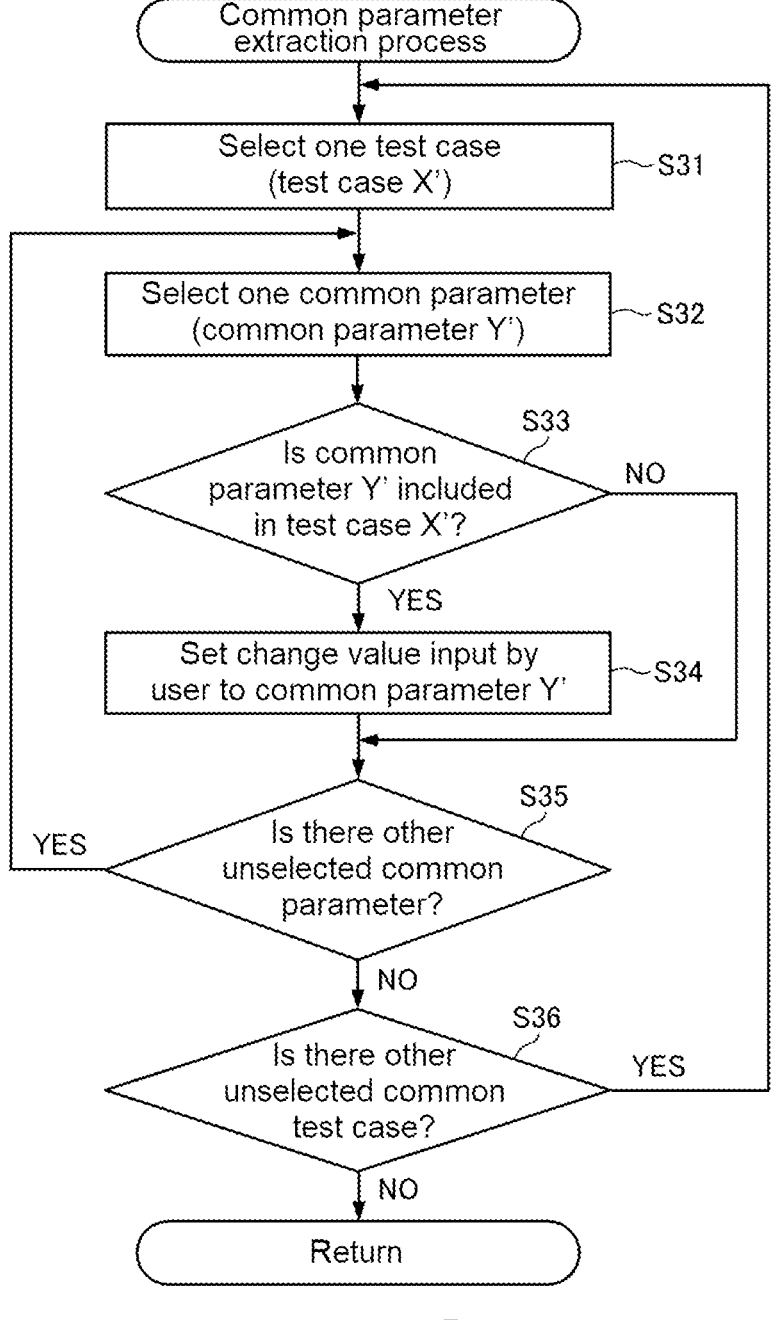
FIG. 5 is a flowchart illustrating a process in a common parameter setting step in the flowchart in FIG. 3.

Hereinafter, a mobile terminal test method using the mobile terminal test system 1 will be described with reference to the flowchart in FIGS. 3 to 5.

First, the test execution control unit 22 reads initial values of test cases and various parameters stored in the test case storage unit 21 (step S1).

Next, a user selects a plurality of test cases, and adds the test cases to a sequence via the operation unit 26 (test case selection step S2).

Next, the test execution control unit 22 causes the display control unit 25 to display a list of test cases and parameters added to the sequence on the display unit 27 (step S3).

Next, the user instructs execution of a common parameter extraction process via the operation unit 26 (step S4).

Next, the common parameter extraction unit 22a of the test execution control unit 22 executes the common parameter extraction process of extracting parameters having the same type, among a plurality of parameters included in the plurality of test cases selected in the test case selection step S2, as a plurality of common parameters (common parameter extraction step S5). Details of the common parameter extraction step S5 will be described below.

Next, the test execution control unit 22 causes the display control unit 25 to display a list of plurality of common parameters extracted in the common parameter extraction step S5 (see, for example, FIG. 2B) on the display unit 27 (common parameter display step S6).

Next, the user inputs a change value of a set value of each of the plurality of common parameters in the list of common parameters displayed on the display unit 27 (for example, see FIG. 2D) via the operation unit 26 (common parameter change input step S7).

Next, the common parameter setting unit 22b of the test execution control unit 22 collectively sets respective change values input in the common parameter change input step S7 to the plurality of common parameters (common parameter setting step S8). Details of the common parameter setting step S8 will be described below.

Next, the test execution control unit 22 displays the list of plurality of common parameters and test cases for which the change values are collectively set in the common parameter setting step S8 (see, for example, FIG. 2C) on the display unit 27 via the display control unit 25 (step S9).

Next, the test execution control unit 22 stores the list of plurality of common parameters and test cases for which the change values are collectively set in the common parameter setting step S8, in the test case storage unit 21 (step S10).

Next, the user instructs execution of a conformance test via the operation unit 26. Therefore, the test execution control unit 22 causes the measurement device 100 to execute measurement of a test of the plurality of test cases in the conformance test, by using various parameters including the plurality of common parameters set in the common parameter setting step S8 (test execution step S11). Hereinafter, the process in common parameter extraction step S5 will be described with reference to the flowchart in FIG. 4.

First, the common parameter extraction unit 22a of the test execution control unit 22 creates an empty common parameter list (step S21).

Next, the common parameter extraction unit 22a selects one test case (temporarily referred to as a "test case X") from a plurality of test cases added to a sequence (step S22).

Next, the common parameter extraction unit 22a selects one parameter (temporarily referred to as a "parameter Y") included in the test case X selected in step S22 (step S23).

Next, the common parameter extraction unit 22a determines whether or not the parameter Y selected in step S23 is included in the common parameter list (step S24). In a case where the parameter Y is not included in the common parameter list, the common parameter extraction unit 22a executes the process in step S25. On the other hand, in a case where the parameter Y is included in the common parameter list, the common parameter extraction unit 22a executes the process in step S26.

In step S25, the common parameter extraction unit 22a adds the parameter Y selected in step S23 to the common parameter list (step S25).

In step S26, the common parameter extraction unit 22a determines whether or not there is a parameter not selected in step S23, among the parameters included in the test case X selected in step S22 (step S26). In a case where there is a parameter that is not selected in step S23, the common parameter extraction unit 22a executes the processes after step S23 again. On the other hand, in a case where there is no parameter that is not selected in step S23, the common parameter extraction unit 22a executes the process in step S27.

In step S27, the common parameter extraction unit 22a determines whether or not there is a test case that is not selected in step S22, among the plurality of test cases added to the sequence (step S27). In a case where there is a test case that is not selected in step S22, the common parameter extraction unit 22a executes the processes after step S22 again. On the other hand, in a case where there is no test case that is not selected in step S22, the common parameter extraction unit 22a ends the process in the common parameter extraction step S5.

Hereinafter, the process in the common parameter setting step S8 will be described with reference to the flowchart in FIG. 5.

First, the common parameter setting unit 22b of the test execution control unit 22 selects one test case (temporarily referred to as a "test case X'") from a plurality of test cases added to a sequence (step S31).

Next, the common parameter setting unit 22b selects one common parameter (temporarily referred to as a "common parameter Y'") included in a common parameter list (step S32).

Next, the common parameter setting unit 22b determines whether or not the common parameter Y' selected in step S32 is included in the test case X' selected in step S31 (step S33). In a case where the common parameter Y' is included in the test case X', the common parameter setting unit 22b executes the process in step S34. On the other hand, in a case where the common parameter Y' is not included in the test case X', the common parameter setting unit 22b executes the process in step S35.

In step S34, the common parameter setting unit 22b sets a change value of the common parameter Y' input by a user in the common parameter change input step S7 to the common parameter Y' (step S34).

In step S35, the common parameter setting unit 22b determines whether or not there is a common parameter that is not selected in step S32, among the common parameters included in the common parameter list (step S35). In a case where there is a common parameter that is not selected in step S32, the common parameter setting unit 22b executes the processes after step S32 again. On the other hand, in a case where there is no common parameter that is not selected in step S32, the common parameter setting unit 22b executes the process in step S36.

In step S36, the common parameter setting unit 22b determines whether or not there is a test case that is not selected in step S31, among the plurality of test cases added to the sequence (step S36). In a case where there is a test case that is not selected in step S31, the common parameter setting unit 22b executes the processes after step S31 again. On the other hand, in a case where there is no test case that is not selected in step S31, the common parameter setting unit 22b ends the process in the common parameter setting step S8.

As described above, the mobile terminal test system 1 according to the present embodiment has a configuration in which common parameters included in a plurality of test cases added to a sequence are extracted and respective change values input by a user via the operation unit 26 are collectively set to a plurality of common parameters. With this configuration, the mobile terminal test system 1 according to the present embodiment does not need for the user to individually set various parameters for each test case, so that it is possible to greatly reduce a time required for setting the parameters for the plurality of test cases. Further, since the mobile terminal test system 1 according to the present embodiment can prevent omissions and mistakes in a setting of the parameters by the user, it is possible to complete measurement of a large number of test cases in a short period of time and with a minimum number of operations.

In addition, the mobile terminal test system 1 according to the present embodiment is configured such that a test case for collectively setting a change value to a common parameter can be arbitrarily designated, among the plurality of test cases. With this configuration, the mobile terminal test system 1 according to the present embodiment can set a value different from the value of other test cases, in some of the plurality of test cases, to the common parameter.

DESCRIPTION OF REFERENCE NUMERALS AND SIGNS

1: mobile terminal test system
10: test execution unit
11: pseudo base station unit
12: coupler
20: control device
21: test case storage unit
22: test execution control unit
22a: common parameter extraction unit
22b: common parameter setting unit
25: display control unit (common parameter display control unit)
26: operation unit (test case selection unit, common parameter change input unit, test case designation unit)
27: display unit
30: text box (common parameter change input unit)
31: check box (test case designation unit)
100: measurement device
200: mobile terminal

What is claimed is:

1. A mobile terminal test system that executes a test of a test case in a conformance test defined by a 3GPP standard of a mobile terminal, the mobile terminal test system comprising:

a test case selection unit that selects a plurality of test cases;

a common parameter extraction unit that extracts common parameters having the same parameter type, among a plurality of parameters included in the plurality of test cases selected by the test case selection unit, as a plurality of common parameters;

a common parameter display control unit that displays a list of the plurality of common parameters extracted by the common parameter extraction unit on a display unit;

a common parameter change input unit that inputs a change value of a set value of each of the plurality of common parameters;

a common parameter setting unit that collectively sets the respective change values input by the common parameter change input unit to each of the corresponding common parameters of the plurality of common parameters in each of the selected plurality of test cases;

a test execution unit that executes a test of the plurality of selected test cases, by using the plurality of common parameters set by the common parameter setting unit, and a test case designation unit that designates, among the plurality of selected test cases, a test case for setting the change value to the common parameter by the common parameter setting unit, wherein the common parameter extraction unit extracts the common parameters by: iterating through the plurality of test cases selected by the test case selection unit; and for each test case, identifying parameters included in the test case and determining whether each identified parameter shares the same parameter type as a parameter in at least one other test case of the plurality of test cases.

2. A mobile terminal test method of executing a test of a test case in a conformance test defined by a 3GPP standard of a mobile terminal, the method comprising:

a test case selection step of selecting a plurality of test cases;

a common parameter extraction step of extracting common parameters having the same parameter type, among a plurality of parameters included in the plurality of test cases selected in the test case selection step, as a plurality of common parameters;

a common parameter display step of displaying a list of the plurality of common parameters extracted in the common parameter extraction step on a display unit;

a common parameter change input step of inputting a change value of a set value of each of the plurality of common parameters;

a common parameter setting step of collectively setting the respective change values input in the common parameter change input step to each of the corresponding common parameters of the plurality of common parameters in each of the selected plurality of test cases; and a test execution step of executing a test of the plurality of selected test cases, by using the plurality of common parameters set in the common parameter setting step, wherein the common parameter setting step further includes a step of designating, among the plurality of selected test cases, a test case for setting the change value to the common parameter, wherein the common parameter extraction step extracts the common parameters by: iterating through the plurality of test cases selected in the test case selection step; and for each test case, identifying parameters included in the test case and determining whether each identified parameter shares the same parameter type as a parameter in at least one other test case of the plurality of test cases.

3. The mobile terminal test system according to claim 1, wherein the common parameter setting unit:

iterates through the plurality of test cases selected by the test case selection unit; and for each test case, determines whether each common parameter of the plurality of common parameters is included in the test case and, in a case where the common parameter is included in the test case, sets the change value input by the common parameter change input unit for the common parameter to the common parameter in the test case.

4. The mobile terminal test system according to claim 3, wherein the common parameter setting step comprises:

iterating through the plurality of test cases selected by the test case selection unit; and for each test case, determining whether each common parameter of the plurality of common parameters is included in the test case and, in a case where the common parameter is included in the test case, setting the change value input by the common parameter change input unit for the common parameter to the common parameter in the test case.

5. The mobile terminal test system according to claim 1, wherein the plurality of common parameters is a band combination, a test frequency, an operating band, a test channel bandwidth, or a subcarrier spacing.

6. The mobile terminal test system according to claim 3, wherein the plurality of common parameters is a band combination, a test frequency, an operating band, a test channel bandwidth, or a subcarrier spacing.

\* \* \* \* \*